(12) United States Patent
Okuyama et al.

(10) Patent No.: US 11,325,296 B2
(45) Date of Patent: May 10, 2022

(54) LIQUID BLOW MOLDING DEVICE AND LIQUID BLOW MOLDING METHOD

(71) Applicants: Yuichi Okuyama, Tokyo (JP); Kenichi Suyama, Tokyo (JP)

(72) Inventors: Yuichi Okuyama, Tokyo (JP); Kenichi Suyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 400 days.

(21) Appl. No.: 16/081,119

(22) PCT Filed: Feb. 2, 2017

(86) PCT No.: PCT/JP2017/003830
§ 371 (c)(1),
(2) Date: Aug. 30, 2018

(87) PCT Pub. No.: WO2017/154430
PCT Pub. Date: Sep. 14, 2017

(65) Prior Publication Data
US 2019/0084211 A1  Mar. 21, 2019

(30) Foreign Application Priority Data

Mar. 11, 2016  (JP) .............................. JP2016-048852

(51) Int. Cl.
*B29C 49/12*   (2006.01)
*B29C 49/46*   (2006.01)
(Continued)

(52) U.S. Cl.
CPC .............. *B29C 49/12* (2013.01); *B29C 49/46* (2013.01); *B29C 49/78* (2013.01); *B29C 49/783* (2013.01);
(Continued)

(58) Field of Classification Search
CPC ......... B29C 49/12; B29C 49/46; B29C 49/78; B29C 49/783; B29C 49/786; B29C 49/58;
(Continued)

(56) References Cited

U.S. PATENT DOCUMENTS

2008/0254160 A1  10/2008  Rousseau et al.
2013/0106027 A1*  5/2013  Maki ..................... B29C 49/786
                                                264/524
(Continued)

FOREIGN PATENT DOCUMENTS

EP  2823948 A1  1/2015
JP  H11-10706 A  1/1999
(Continued)

OTHER PUBLICATIONS

Mar. 30, 2020 Office Action issued in Chinese Patent Application No. 201780014829.9.
(Continued)

*Primary Examiner* — Matthew J Daniels
*Assistant Examiner* — Gregory C. Grosso
(74) *Attorney, Agent, or Firm* — Oliff PLC (57) ABSTRACT

A liquid blow molding device and a liquid blow molding method are configured to supply pressurized liquid to a preform mounted to a mold to mold the preform into a shape along a cavity of the mold, and includes a blow nozzle fitted into a mouth portion of the preform, a plunger pump configured to supply pressurized liquid to the preform through the blow nozzle and a controller configured to control operation of the plunger pump. The controller controls operation of the plunger pump by position control in which a plunger of the plunger pump is moved from an original position to a predetermined final position with a predetermined operating force.

4 Claims, 5 Drawing Sheets

(51) Int. Cl.
*B29C 49/78* (2006.01)
*B29L 31/00* (2006.01)
*B29C 49/58* (2006.01)

(52) U.S. Cl.
CPC ............ *B29C 49/786* (2013.01); *B29C 49/58* (2013.01); *B29C 2049/4652* (2013.01); *B29C 2049/4664* (2013.01); *B29C 2949/78563* (2013.01); *B29L 2031/7158* (2013.01)

(58) Field of Classification Search
CPC .... B29C 2049/4652; B29C 2049/4664; B29C 2949/78563; B29L 2031/7158
USPC ......................................................... 264/532
See application file for complete search history.

(56) References Cited

U.S. PATENT DOCUMENTS

2015/0246475 A1* 9/2015 Suyama ................. B29C 49/58
264/526
2015/0328824 A1* 11/2015 Morikami ............... B29C 49/12
425/524
2017/0008216 A1* 1/2017 Suyama ................ B29C 49/783
2017/0312978 A1* 11/2017 Okuyama ................ B29C 49/46

FOREIGN PATENT DOCUMENTS

| JP | 2015-139988 A | 8/2015 |
| JP | 2016-032922 A | 3/2016 |

OTHER PUBLICATIONS

Oct. 10, 2019 Extended Search Report issued in European Patent Application No. 17762775.9.
Oct. 29, 2019 Office Action issued in Chinese Patent Application No. 201780014829.9.
Mar. 7, 2017 International Search Report issued in International Patent Application No. PCT/JP2017/003830.

* cited by examiner

LIQUID BLOW MOLDING DEVICE AND LIQUID BLOW MOLDING METHOD

TECHNICAL FIELD

The present disclosure relates to a liquid blow molding device configured to supply pressurized liquid to a bottomed tubular preform mounted to a blow molding mold to form the preform into a shape along a cavity of the mold and a liquid blow molding method.

BACKGROUND

Resin bottles as represented by oriented polypropylene (OPP) bottles and polyethylene terephthalate bottles (PET bottles) are used for a variety of applications such as beverages, foods, cosmetics and the like. In general, such bottles are formed into a predetermined shape by heating a resin preform formed into a bottomed tubular shape through injection molding to temperatures at which stretching effect can be expressed, and in this state, by subjecting the preform to a biaxial orientation blow molding by using a blow molding device.

As a blow molding device, a liquid blow molding device configured to use pressurized liquid instead of pressurized air as pressurized fluid supplied into a preform has been known. In the liquid blow molding device, as its pressurized fluid, content liquids such as beverages, cosmetics and chemicals filled finally in bottles as end-products are used, and as a result, a process of filling content liquid into a bottle can be omitted. Thus the production process and the configuration of the production device can be simplified.

For example, Patent Literature 1 discloses a liquid blow molding device that includes a blow molding mold into which a preform is mounted, a blow nozzle configured to be fitted into a mouth portion of the preform mounted to the mold, a plunger pump configured to supply pressurized liquid to the preform through the blow nozzle, and a vertically movable stretching rod. In the liquid blow molding device, while the preform is stretched in the longitudinal (axial) direction by the stretching rod, it is stretched in the lateral (radial) direction by a controller which controls operation of the plunger pump to supply liquid that is pressurized to a predetermined pressure into the preform. Thus the preform is formed into a bottle in the shape along a cavity of the mold.

CITATION LIST

Patent Literature

PTL 1: JP2015-139988A

SUMMARY

Technical Problem

In the above described existing liquid blow molding device, when the plunger pump is operated at a predetermined primary torque for a predetermined time period and the pressure in the preform is detected to be a predetermined pressure, the controller controls by the torque control in which the plunger pump is operated at a secondary torque that is lower than the primary torque for a predetermined time period to keep the pressure of the liquid in the container at a predetermined value.

However, in the configuration where the plunger pump is controlled by the torque control, the working torque is needed to be switched immediately when the pressure in the preform is detected to reach a predetermined pressure. Thus it is difficult to stabilize the working stroke of the plunger, and liquid is supplied to the preform with an excessive pressure or with a pressure less than the required pressure, which causes a problem with unstable fill level volume of a container after it is molded.

The present disclosure is to solve the above problem, and to provide a liquid blow molding device that can stably manufacture a container whose predetermined fill level volume is secured and a liquid blow molding method.

Solution to Problem

The disclosed liquid blow molding device is a liquid blow molding device configured to supply pressurized liquid to a bottomed tubular preform that is mounted to a blow molding mold to mold the preform into a shape along a cavity of the mold, and the device includes a blow nozzle configured to be fitted into a mouth portion of the preform, a plunger pump configured to supply pressurized liquid to the preform through the blow nozzle, and a controller configured to control operation of the plunger pump. The controller controls operation of the plunger pump by the position control in which a plunger of the plunger pump is moved from an original position to a predetermined final position with a predetermined operating force.

In the above described configuration, preferably, the controller of the disclosed liquid blow molding device controls the plunger pump such that, after the plunger is moved from the original position to the final position with a predetermined operating force, the plunger is held to the final position for a predetermined time period.

In the above described configuration, preferably, the controller of the disclosed liquid blow molding device controls the plunger pump such that, after the plunger is moved from the original position to the final position with a predetermined operating force and is returned from the final position by a predetermined return distance, the plunger is held to a position where the plunger is returned for a predetermined time period.

In the above described configuration, preferably, the plunger pump of the disclosed liquid blow molding device is a servo plunger type in which an electric motor is employed as a driving source, and the controller controls operation of the electric motor.

In the above described configuration, preferably, the disclosed liquid blow molding device includes a seal body configured to open/close the blow nozzle, and when an open operation of the seal body is started, supply of pressurized liquid from the plunger pump into the preform is started.

In the disclosed liquid blow molding method, pressurized liquid is supplied to a bottomed tubular preform that is mounted to a blow molding mold to mold the preform into a shape along a cavity of the mold, and the method includes the processes of fitting a blow nozzle into a mouth portion of the preform; and operating a plunger pump by the position control in which a plunger is moved from an original position to a predetermined final position with a predetermined operating force to supply pressurized liquid to the preform through the blow nozzle.

In the above-described disclosed liquid blow molding method, preferably, after the plunger is moved from the original position to the final position with a predetermined operating force, the plunger is held to the final position for a predetermined time period.

In the above-described disclosed liquid blow molding method, preferably, after the plunger is moved from the original position to the final position with a predetermined operating force and is returned from the final position by a predetermined return distance, the plunger is held to a position where the plunger is returned for a predetermined time period.

In the above-described disclosed liquid blow molding method, preferably, the plunger pump is a servo plunger type that employs an electric motor as a driving source.

In the above-described disclosed liquid blow molding method, preferably, when an opening operation of a seal body to open/close the blow nozzle is started, supply of pressurized liquid from the plunger pump into the preform is started.

Advantageous Effect

The present disclosure provides a liquid blow molding device that can stably manufacture a container whose predetermined fill level volume is secured and a liquid blow molding method.

DETAILED DESCRIPTION

Figure 1:
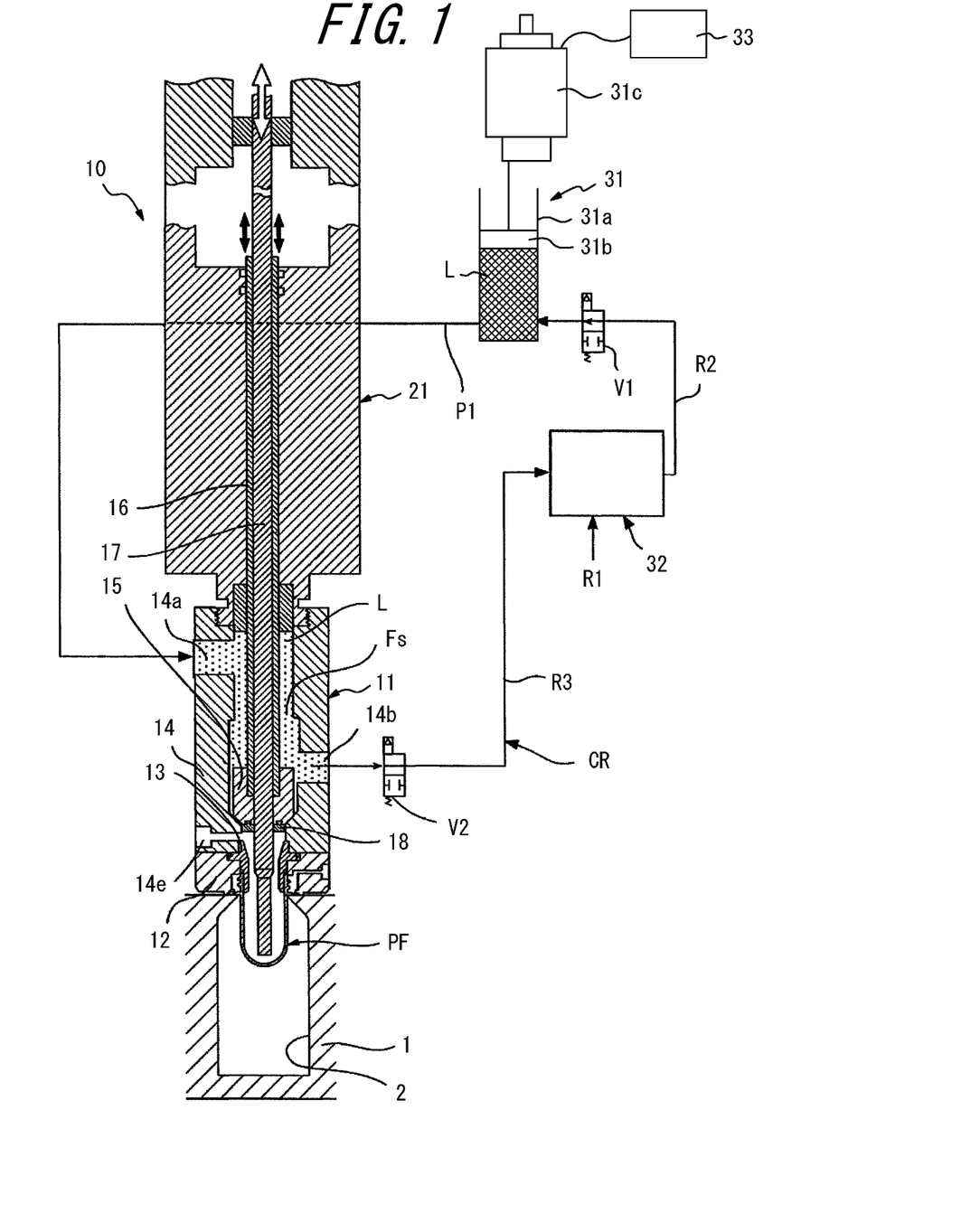
FIG. 1 is a diagram schematically illustrating a liquid blow molding device according to an embodiment of the present disclosure.
Figure 2:
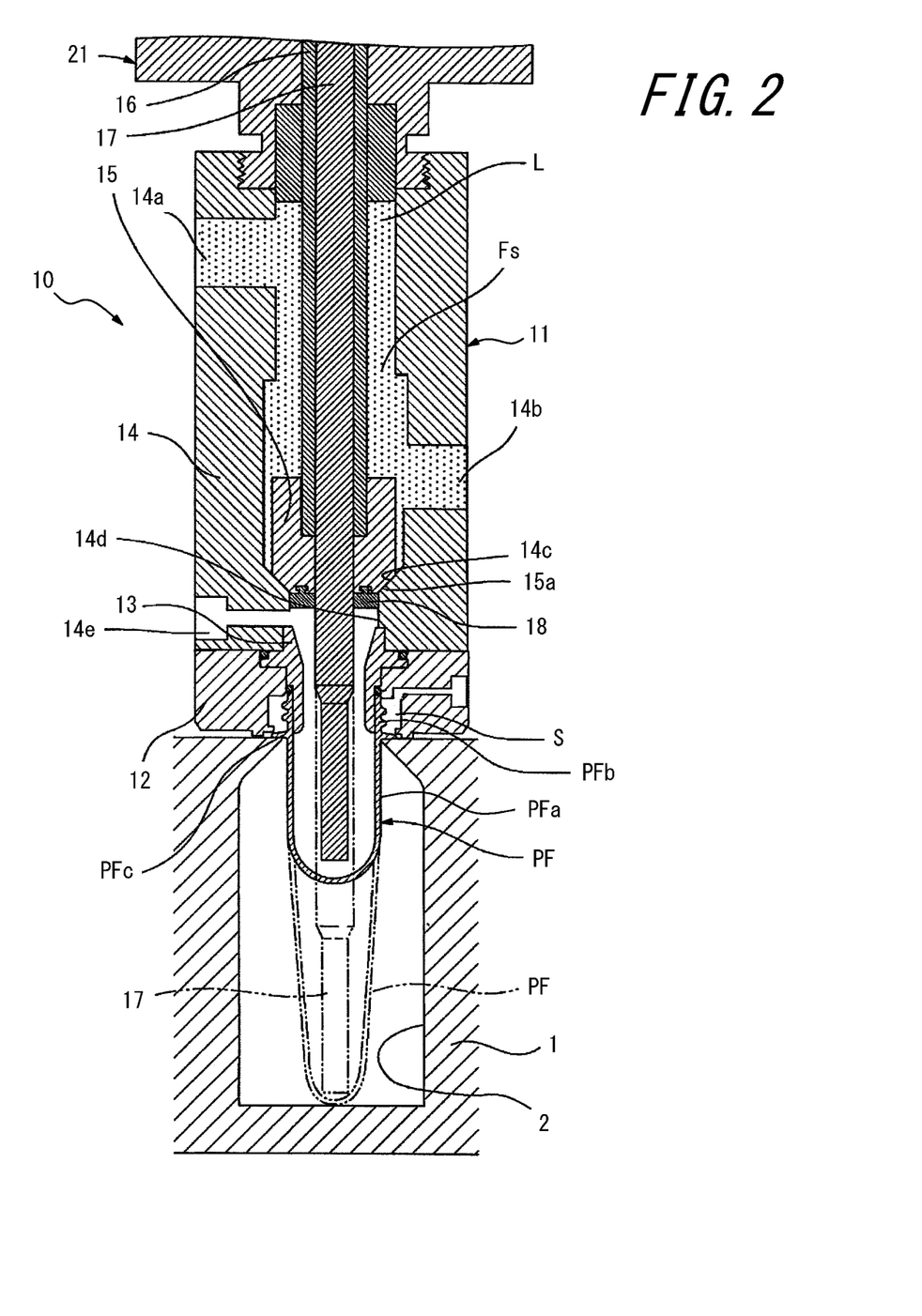
FIG. 2 is an enlarged cross sectional diagram of a filling head illustrated in FIG. 1.

As illustrated in FIGS. 1 and 2, a liquid blow molding device according to an embodiment of the present disclosure has a blow molding mold 1. A cavity 2 of the mold 1 has a bottle shape, and is opened upward on the upper surface of the mold 1. Although not illustrated in detail, the mold 1 is configured to be opened right and left, and a molded product can be removed from the mold 1 by opening the mold 1.

A preform PF that is subjected to blow molding by the liquid blow molding device to be formed into a bottle shaped container can be mounted to the mold 1. FIGS. 1 and 2 illustrate a state where the preform PF is mounted to the mold 1. As illustrated in FIG. 2, as the preform PF, the one that is totally formed into a bottomed tubular shape by the resin material such as polypropylene (PP), for example, can be used. In the preform PF, the upper end of a body PFa formed into a test tube shape is integrally provided with a cylindrical mouth portion PFb, and the lower end of the mouth portion PFb is integrally provided with a neck ring PFc. The preform PF is mounted to the mold 1 with its body PFa disposed in the cavity 2 of the mold 1 along its axial center and with its neck ring PFc abutted the upper surface of the mold 1 and the mouth portion PFb projected outside the mold 1 (upward in FIG. 1).

As illustrated in FIG. 1, a nozzle unit 10 is provided on the upper side of the mold 1 vertically movably relative to the mold 1. The nozzle unit 10 is tubular as a whole, and includes a filling head 11 and a supporting portion 21 to which the filling head 11 is connected.

The filling head 11 includes a holding member 12, a blow nozzle 13 and a supply tubular portion 14.

The holding member 12 is formed into a block shape provided with a through hole that vertically passes through the center thereof, and a tubular blow nozzle 13 is mounted inside the through hole. When the nozzle unit 10 is lowered to the lower end, the mouth portion PFb of the preform PF mounted to the mold 1 is disposed inside the through hole, and the blow nozzle 13 is fitted into the mouth portion PFb and the neck ring PFc is sandwiched between the lower end of the holding member 12 and the upper surface of the mold 1. Thus the preform PF is held in a vertical mount attitude relative to the mold 1.

It is to be noted that, as illustrated in FIG. 2, a surrounding space S is formed between the outer periphery of the mouth portion PFb of the preform PF mounted to the mold 1 and the inner periphery of the holding member 12 to separate them.

The supply tubular portion 14 is formed into a cylindrical member provided with a supply channel Fs vertically extending therethrough, and is fixed to the upper end of the holding member 12 to be vertically movable along with the holding member 12 relative to the mold 1. An introduction port 14a connected to the supply channel Fs is provided on the upper end side of the supply tubular portion 14, and on the lower end side thereof is provided with a discharge port 14b connected to the supply channel Fs. Further, a conical sealing surface 14c sloped downward in a diameter reducing manner is provided on the lower end of the inner surface that forms the supply channel Fs of the supply tubular portion 14, and a supply port 14d that opens the supply channel Fs downward such that it communicates with the blow nozzle 13 is provided to the axial center of the sealing surface 14c.

A seal body 15 configured to open and close the supply port 14d, that is, the blow nozzle 13, is disposed inside the supply channel Fs. The seal body 15 is formed into a short columnar shape, and the outer peripheral edge of the lower end thereof is provided with a tapered abutting surface 15a. The abutting surface 15a has the same inclination angle as that of the sealing surface 14c, and can adhere to the sealing surface 14c. Inside the supply channel Fs, an elongated cylindrical rod-like shaft body 16 is disposed along the axial center of the supply channel Fs. The shaft body 16 passes through the upper end of the supply tubular portion 14 in a liquid tight manner and is supported vertically movable relative to the filling head 11 and the supporting portion 21 by the supporting portion 21. The seal body 15 is coaxially fixed to the lower end of the shaft body 16 and is vertically movable along with the shaft body 16 inside the supply channel Fs. When the shaft body 16 moves downward to the stroke end, the abutting surface 15a of the seal body 15 abuts the sealing surface 14c on the lower end of the supply tubular portion 14, and the supply port 14d, that is, the blow nozzle 13, is closed by the seal body 15. On the other hand, when the seal body 15 moves upward along with the shaft body 16, the abutting surface 15a of the seal body 15 moves away from the sealing surface 14c of the supply tubular portion 14, and the supply port 14d, that is, the blow nozzle 13, is opened.

The shaft body 16 is hollow, and inside thereof is provided with an stretching rod 17 in a slidable manner. The stretching rod 17 is axially movable relative to the shaft body 16, and the lower end thereof projects from the lower end of the seal body 15. As illustrated in FIG. 2 with a two-dot chain line, the stretching rod 17 moves downward and thus can longitudinally (axially) stretch the preform PF.

It is to be noted that a guide body 18 that is formed into a short cylindrical shape and made of polyetheretherketone (PEEK) is fixed to the lower end of the seal body 15 to guide the stretching rod 17.

As illustrated in FIG. 1, a plunger pump 31 and a liquid circulating portion 32 are connected to the nozzle unit 10.

The plunger pump 31 includes a cylinder 31a and a plunger 31b that is mounted movable along the axial direction in the cylinder 31a, and is configured to supply pressurized liquid L from the introduction port 14a of the supply tubular portion 14 into the supply channel Fs through a piping P1 when the plunger 31b is operated. When the seal body 15 moves upward and the supply port 14d, that is, the blow nozzle 13, is opened, the plunger 31b is operated, thus pressurized liquid L can be supplied from the plunger pump 31 to the blow nozzle 13 through the supply channel Fs. When pressurized liquid L is supplied (filled) into the preform PF through the blow nozzle 13, the preform PF is subjected to liquid blow molding and formed into a shape along the cavity 2 of the mold 1.

The plunger pump 31 is a servo plunger type provided with an electric motor 31c as a driving source, and the plunger 31b is driven by the electric motor 31c and is configured to operate in the axial direction in the cylinder 31a.

A control device 33 as a controller is connected to the electric motor 31c. The control device 33 controls operation of the electric motor 31c, that is, operation of the plunger pump 31. A device such as a rotary encoder that detects rotation amount of the electric motor 31c and a linear encoder that can detect position or working stroke of the plunger 31b, for example, is connected to the control device 33. The control device 33 is configured to control operation of the plunger pump 31 by the position control, not by the torque control, on the basis of the input from the device.

It is to be noted that, the torque control is a control method in which the electric motor 31c is operated at a predetermined torque and a predetermined rotation speed for a predetermined time period, that is, the plunger 31b is operated with a predetermined operating force for a predetermined time period, and when the blow pressure of liquid L exceeds a predetermined value, the operating force of the plunger 31b is decreased to a predetermined value and the plunger 31b is operated for a predetermined time period, and the position control is a control method in which the plunger is moved from an original position to a predetermined final position, that is, the plunger is moved by a predetermined working stroke with the operating force kept constant.

The control device 33 can perform control operation in conjunction with a control system configured to control operation of the seal body 15 and the stretching rod 17 of the liquid blow molding device. Further, the control device 33 can be configured as a part of such a control system.

When supplying pressurized liquid L to the blow nozzle 13, the control device 33 operates the electric motor 31c at a predetermined torque and rotation speed (number of rotation per unit time) and moves the plunger 31b from the original position to the predetermined final position with a predetermined operating force. Further, when the plunger 31b moves from the original position and reaches the final position, the control device 33 controls to stop operation of the electric motor 31c. Moreover, after stopping operation of the electric motor 31c, the control device 33 controls the plunger pump 31 such that the plunger 31b is held to the final position for a predetermined time period. In other words, the control device 33 controls operation of the plunger pump 31 such that the plunger 31b is moved from the original position to the predetermined final position with a predetermined operating force to increase the pressure of liquid L supplied into the preform PF to a predetermined pressure, and after that, the plunger 31b is held to the final position for a predetermined time period to keep the pressure of liquid L to a predetermined pressure. By controlling operation of the plunger pump 31 by using such a position control, the working stroke of the plunger 31b can be more stabilized than the case where the torque control type plunger pump is used, and liquid L is supplied at a specified pressure into the preform PF with high accuracy, thus a container can be formed into a predetermined shape with high accuracy. Therefore, the preform PF is subjected to liquid blow molding and is reliably formed into a predetermined shape, thus a container with a secured predetermined fill level volume can be stably manufactured.

In the present disclosure, when the seal body 15 moves upward and its open operation is started, the control device 33 starts operation of the plunger pump 31 to start supplying pressurized liquid L from the plunger pump 31 into the preform PF. In other words, when the open operation of the seal body 15 is started, operation of the electric motor 31c is controlled by the control device 33 such that the electric motor 31c is operated at a predetermined torque and rotation speed to move the plunger 31b driven by the electric motor 31c from the original position to the final position with a predetermined operating force.

The liquid circulating portion 32 serves to supply liquid L to the plunger pump 31 through the piping R2 by adjusting the liquid temperature to a predetermined temperature while refilling the liquid from the piping R1 and to circulate the liquid between the plunger pump 31 and the supply channel Fs while adjusting the liquid temperature to a predetermined temperature. In other words, as necessary, the liquid circulating portion 32 may circulate liquid L through a cyclic channel CR configured as follows: supply channel Fs→discharge port 14b→piping R3→liquid circulating portion 32→piping R2→plunger pump 31→piping R1→introduction port 14a→supply channel Fs.

The cyclic channel CR is provided with two solenoid valves V1 and V2, and a specific flow channel is opened and closed by corresponding valve V1 or V2 depending on each process of blow molding.

The supply tubular portion 14 is provided with a connection port 14e configured to communicate with the blow nozzle 13 through the supply port 14d. This connection port 14e may be connected, for example, to a deaeration system that sucks the air in the preform PF before a blow molding or to a system that instantaneously supplies low pressure air into the connection port 14e to discharge liquid remained in the connection port 14e.

Figure 3:
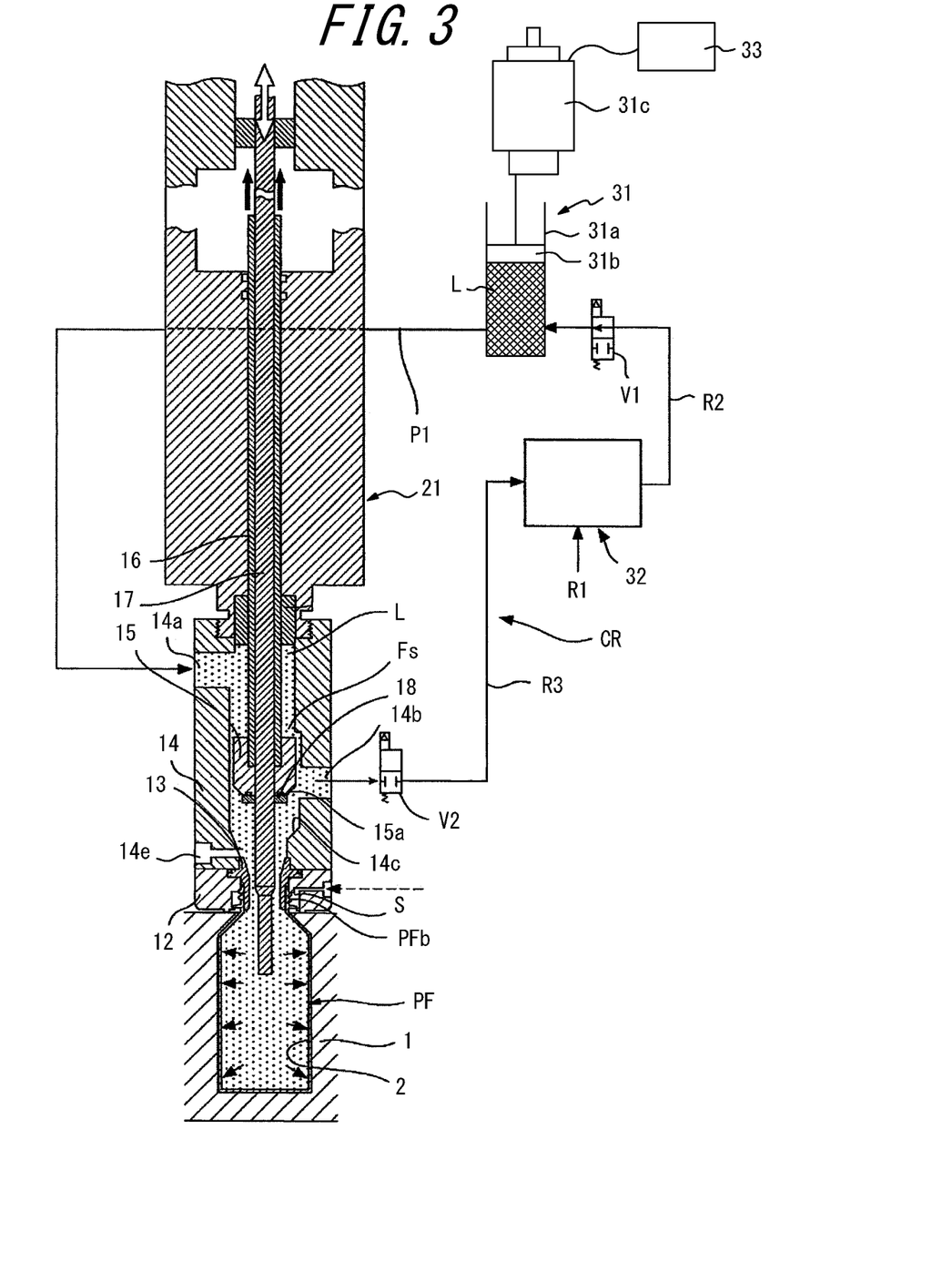
FIG. 3 is a diagram illustrating a state where a preform of the liquid blow molding device illustrated in FIG. 1 is subjected to liquid blow molding.
Figure 4:
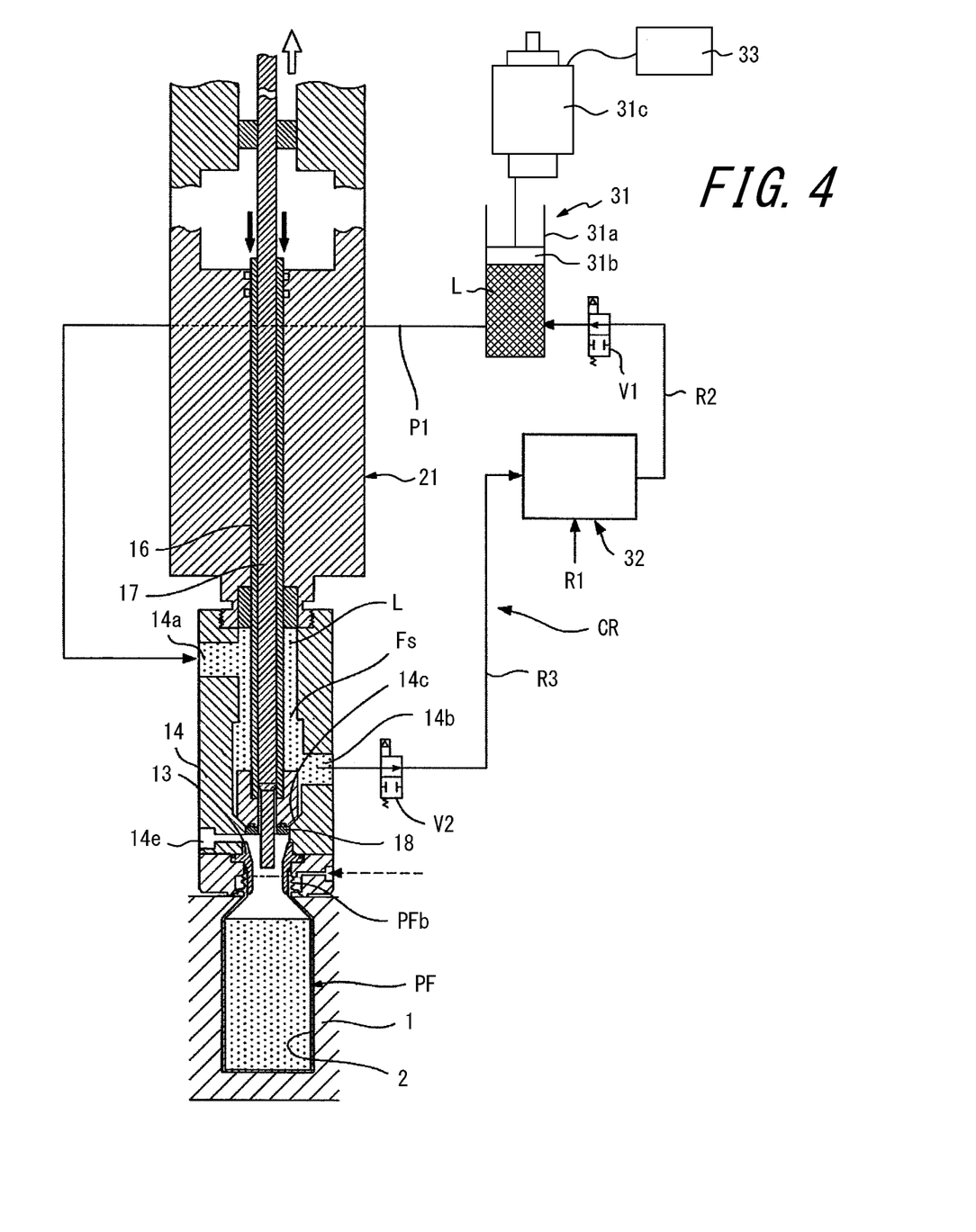
FIG. 4 is a diagram illustrating a state where blow molding of the liquid blow molding device illustrated in FIG. 1 is finished.
Figure 5:
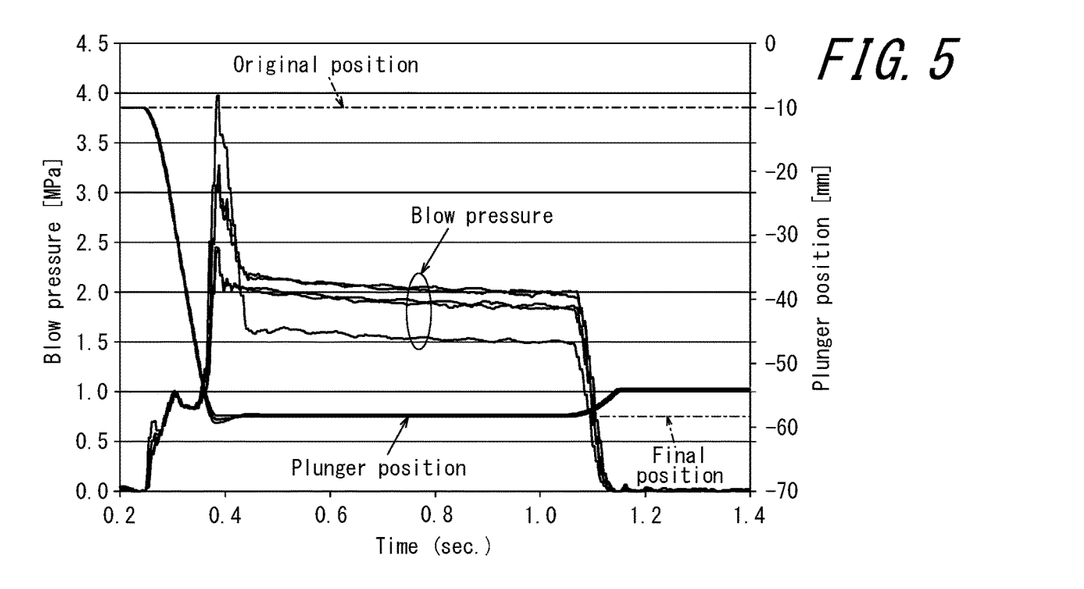
FIG. 5 is a characteristic diagram illustrating a blow pressure waveform of a liquid blow molding device according to a comparative example along with a plunger position.
Figure 6:
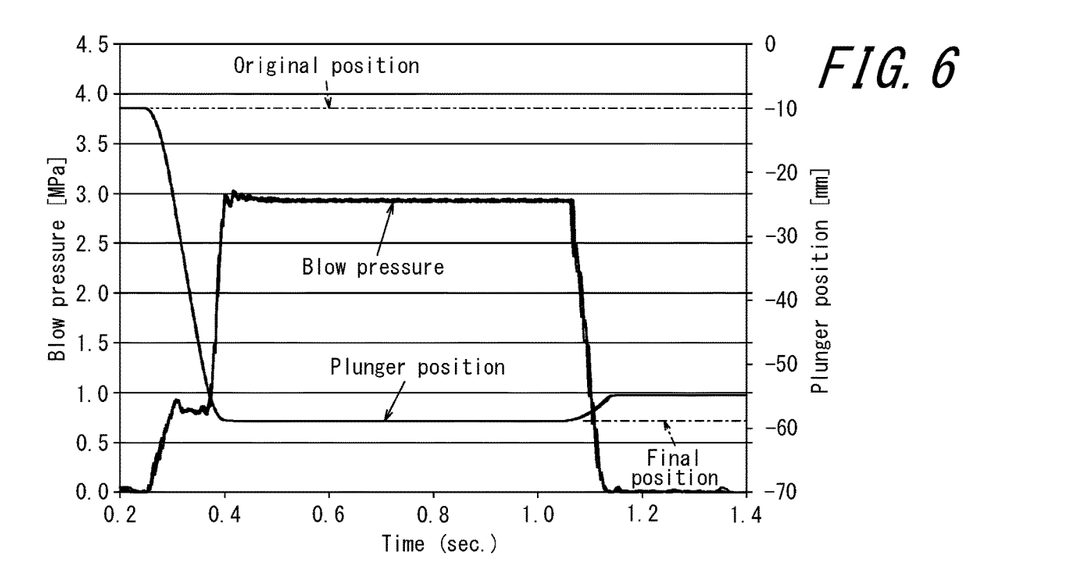
FIG. 6 is a characteristic diagram illustrating a blow pressure waveform of the liquid blow molding device illustrated in FIG. 1 along with a plunger position.

FIG. 3 is a diagram that illustrates a state where the preform of the liquid blow molding device illustrated in FIG. 1 is subjected to liquid blow molding, and FIG. 4 is a diagram that illustrates a state where blow molding of the liquid blow molding device illustrated in FIG. 1 is finished. It is to be noted that, in FIGS. 3 and 4, the same reference signs are assigned to members that correspond to the above described members. Further, FIG. 5 is a characteristic diagram that illustrates a waveform of the blow pressure in the liquid blow molding device according to a comparative example along with a plunger position, and FIG. 6 is a characteristic diagram that illustrates a waveform of the blow pressure in the liquid blow molding device illustrated in FIG. 1 along with a plunger position. It is to be noted that FIGS. 5 and 6 illustrate data for five times as a waveform of blow pressure.

Next, a procedure of manufacturing a bottle shaped container through liquid blow molding of the preform PF by using such a liquid blow molding device, that is, a liquid blow molding method according to an embodiment of the present disclosure, is described with reference to FIGS. 1 to 4 as necessary.

First, the preform PF, except for its mouth portion PFb, heated to a temperature appropriate for the liquid blow molding is mounted to the blow molding mold 1 with the mouth portion PFb projected upward, and is clamped.

Next, the nozzle unit 10 is lowered and the neck ring PFc is sandwiched between the holding member 12 and the upper surface of the mold 1 such that the preform PF is held by the mold 1 and the blow nozzle 13 is fitted into the mouth portion PFb of the preform PF. In this case, the supply port 14d is closed by the seal body 15 and both of the valves V1 and V2 of the cyclic channel CR are opened. Then liquid L circulates in the cyclic channel CR while being adjusted to a predetermined temperature by the liquid circulating portion 32. FIG. 1 illustrates this state.

Next, as illustrated by a two-dot chain line in FIG. 2, the stretching rod 17 is moved downward and the preform PF is stretched in the longitudinal (axial) direction by the stretching rod 17.

Further, during stretching of the preform PF in the longitudinal (axial) direction by the stretching rod 17, the valves V1 and V2 are closed to stop circulation of liquid L along the cyclic channel CR and, as illustrated in FIG. 3, the seal body 15 is moved upward along with the shaft body 16 to open the blow nozzle 13. When the seal body 15 starts opening operation, operation of the electric motor 31c is started by the control device 33, and the plunger 31b starts operation from the original position to the final position. In this manner, the plunger pump 31 is operated by the position control in which the plunger 31b is moved from the original position to the predetermined final position with a predetermined operating force, and pressurized liquid L pumped from the plunger pump 31 is supplied into the preform PF through the blow nozzle 13. Thus liquid blow molding is performed. Further, when the plunger 31b reaches the final position, operation of the plunger 31b is stopped, and liquid L is kept in a pressurized state with the seal body 15 opened until a predetermined time passes.

By such a blow molding, the preform PF is laterally (radially) stretched in a swelling manner by the pressure of liquid L supplied from the plunger pump 31, and can be formed into a container in the shape along the cavity 2 of the mold 1.

It is to be noted that, in the blow molding, when the diameter of the mouth portion PFb of the preform PF is expanded and deformed by the pressure of liquid L, such diameter expansion and deformation can be effectively suppressed by supplying pressurized air to the space S between the holding member 12 and the mouth portion PFb through a pressurized air flow channel not illustrated.

Here, in the liquid blow molding device according to a comparative example in which operation of the plunger pump is controlled by the torque control, the plunger is operated with a predetermined operating force for a predetermined time period, and when the pressure of the liquid reaches a predetermined pressure, the pressure is detected and the working torque of the plunger is switched to a lower torque, then the plunger is further operated for a predetermined time period. Thus, as illustrated in FIG. 5, the working stroke of the plunger is not stable during switching of the torque, and further, the pressure held after the switching varies, which may result in supply of liquid to the preform at an excessive pressure or a pressure less than the required pressure. Thus, a predetermined shaped container cannot be formed with high accuracy, and a problem of unstable fill level volume of a container after molding may occur.

On the other hand, in the disclosed liquid blow molding device, the control device 33 controls operation of the plunger 31b by the position control. Thus, as can be seen from FIG. 6, the plunger 31b moves from the original position to the final position, and when reaching the final position, the plunger 31b stops at the final position with high accuracy without moving beyond the position. Therefore, when the plunger 31b reaches the final position, the pressure of liquid L supplied to the preform PF reaches a predetermined pressure, and after that, the pressure is held for a predetermined time period without causing a substantial pressure fluctuation. In this manner, since the plunger 31b can be stopped at the final position with high accuracy, the pressure at which the plunger 31b reaches the final position can be set to a specified pressure with high accuracy. Therefore, even if the liquid blow molding is performed repeatedly, the preform PF can always be formed into a container having a predetermined shape with high accuracy with the pressure of liquid L supplied to the preform PF defined as a specified pressure.

In this manner, in the disclosed liquid blow molding device, operation of the plunger pump 31 is controlled by the position control, and compared with the case where a torque control type plunger pump is used, the pressure of liquid L supplied to the preform PF can be set to a specified pressure with high accuracy. Thus a container whose fill level volume from the preform PF is secured can be stably manufactured.

After the liquid blow molding is finished, as illustrated in FIG. 4, the seal body 15 is lowered along with the shaft body 16 to close the supply port 14d, that is, the blow nozzle 13, and liquid L is circulated again along the cyclic channel CR with the valves V1 and V2 opened. Subsequently, the stretching rod 17 is moved upward and removed from the preform PF, then a head space for the stretching rod 17 is formed in a molded container. After that, when the nozzle unit 10 is raised, the blow nozzle 13 is removed from the mouth portion of the container formed into a bottle shape, and the mold 1 is opened to allow a container filled with liquid L to be removed. The mouth portion of the container is sealed with a cap or the like and is provided as a product that contains liquid L as a content liquid.

It goes without saying that the present disclosure is not limited to the above described embodiment, and can be modified in various ways without departing from the spirit of the disclosure.

For example, in the above described embodiment, the control device 33 is configured to control the plunger pump 31 or the electric motor 30c such that the plunger 31b is moved from the original position to the final position with a predetermined operating force, and then is held to the final position for a predetermined time period. However, it is not limited thereto, and the control device 33 may be configured to control the plunger pump 31 or the electric motor 31c such that the plunger 31b is moved from the original position to the final position with a predetermined operating force and is returned from the final position by a predetermined distance, then is held to the final position for a predetermined time period. In this case, the waveform of the blow pressure of liquid L supplied to the preform PF may be formed to include a peak pressure at which the blow pressure instantly rises to a maximum value and a pressure lower than the peak pressure at which the pressure of liquid L is kept. Thus the formablity of a container by the liquid blow molding can be improved as needed.

Further, in the above described embodiment, the plunger pump 31 is a servo plunger type in which the plunger 31b is driven by the electric motor 31c, but it is not limited thereto, and the plunger pump 31 may be configured to be driven by other drive systems such as a hydraulic cylinder or a pneumatic cylinder, for example.

Moreover, in the above described embodiment, liquid L is circulated through the cyclic channel CR, but it is not limited thereto, and liquid L may not be circulated through the cyclic channel CR as long as pressurized liquid L may be supplied from the plunger pump 31 into the preform PF through the blow nozzle 13.

Moreover, in the above described embodiment, the seal body 15 is opened during longitudinal stretching of the stretching rod 17 to supply pressurized liquid L into the preform PF. However, supply of pressurized liquid L into the preform PF may be started simultaneously with the starting of longitudinal stretching by the stretching rod 17, or supply of pressurized liquid L into the preform PF may be started when longitudinal stretching by the stretching rod 17 is finished.

It is to be noted that, without using the stretching rod 17, the preform PF may be stretched both longitudinally (axially) and laterally (radially) in a swelling manner by only using the pressure of liquid L supplied from the plunger pump 31 and be formed into a bottle shape along the cavity 2 of the mold 1.

Moreover, as the preform PF, the one that includes the body PFa and the mouth portion PFb but does not include the neck ring PFc can be used. Further, material of the preform PF is not limited to polypropylene, and other resin materials such as polyethylene terephthalate (PET) may be used. Moreover, the preform PF may be the one that has multilayer structure for molding a delamination container.

REFERENCE SIGNS LIST

1 Mold
2 Cavity
10 Nozzle unit
11 Filling head
12 Holding member
13 Blow nozzle
14 Supply tubular portion
14a Introduction port
14b Discharge port
14c Sealing surface
14d Supply hole
14e Connection port
15 Seal body
15a Abutting surface
16 Shaft body
17 Stretching rod
18 Guide body
21 Supporting portion
31 Plunger pump
31a Cylinder
31b Plunger
31c Electric motor
32 Liquid circulating portion
33 Control device (controller)
PF Preform
PFa Body
PFb Mouth portion
PFc Neck ring
S Space
Fs Supply channel
P1 Piping
L Liquid
R1 Piping
R2 Piping
R3 Piping
CR Circulation channel
V1 Valve
V2 Valve

The invention claimed is:

1. A liquid blow molding device configured to supply pressurized liquid to a bottomed tubular preform mounted to a blow molding mold to form the preform into a shape along a cavity of the mold, comprising:
   a blow nozzle configured to be fitted into a mouth portion of the preform;
   a plunger pump configured to supply pressurized liquid to the preform through the blow nozzle; and
   a controller configured to control operation of the plunger pump, wherein
   the controller controls operation of the plunger pump, during supplying of the pressurized liquid to the preform for stretching the preform, by position control in which a plunger of the plunger pump is moved from an original position with a predetermined operating force by operating a motor at a predetermined torque, and is stopped at a predetermined final position and held to the final position for a predetermined time period, and not by torque control in which the plunger is first operated with a predetermined operating force for a predetermined time period until a blow pressure of liquid exceeds a predetermined value, and then the operating force is changed.

2. The liquid blow molding device according to claim 1, wherein the controller controls the plunger pump such that, after moving the plunger from the original position to the final position with the predetermined operating force and returning the plunger from the final position by a predetermined return distance, holding the plunger to a position where the plunger is returned for a predetermined time period.

3. The liquid blow molding device according to claim 1, wherein the plunger pump is a servo plunger type in which an electric motor is used as a driving source, and the controller controls operation of the electric motor.

4. The liquid blow molding device according to claim 1, comprising a seal body configured to open/close the blow nozzle, wherein when open operation of the seal body is started, supply of pressurized liquid from the plunger pump into the preform is started.

* * * * *